(12) United States Patent
Hietala et al.

(10) Patent No.: US 11,226,924 B2
(45) Date of Patent: Jan. 18, 2022

(54) SINGLE-WIRE BUS APPARATUS SUPPORTING SLAVE-INITIATED OPERATION IN A MASTER CIRCUIT

(71) Applicant: Qorvo US, Inc., Greensboro, NC (US)

(72) Inventors: Alexander Wayne Hietala, Phoenix, AZ (US); Christopher Truong Ngo, Queen Creek, AZ (US); Praveen Varma Nadimpalli, Chandler, AZ (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/549,116

(22) Filed: Aug. 23, 2019

(65) Prior Publication Data
US 2020/0341939 A1 Oct. 29, 2020

Related U.S. Application Data

(60) Provisional application No. 62/837,881, filed on Apr. 24, 2019.

(51) Int. Cl.
*G06F 13/00* (2006.01)
*G06F 13/42* (2006.01)
(Continued)

(52) U.S. Cl.
CPC ........ *G06F 13/4295* (2013.01); *G06F 13/362* (2013.01); *H04L 12/403* (2013.01); *H04L 12/40013* (2013.01)

(58) Field of Classification Search
CPC ... G06F 13/4295; G06F 13/36; H04L 12/403; H04L 12/40013
See application file for complete search history.

(56) References Cited

U.S. PATENT DOCUMENTS 3,953,835 A 4/1976 Cuccio et al.
5,412,644 A * 5/1995 Herberle ................ G11C 5/066
370/445

(Continued)

OTHER PUBLICATIONS

"Transmitting Data and Power over a One-Wire Bus" by Dan Awtrey, Dallas Semiconductor, Feb. 1997 (Year: 1997).*

(Continued)

*Primary Examiner* — Jing-Yih Shyu
(74) *Attorney, Agent, or Firm* — Withrow & Terranova, P.L.L.C.

(57) ABSTRACT

A single-wire bus (SuBUS) apparatus is provided. The SuBUS apparatus includes a master circuit coupled to a slave circuit(s) by a SuBUS. The master circuit can enable or suspend a SuBUS telegram communication over the SuBUS. When the master circuit suspends the SuBUS telegram communication over the SuBUS, the slave circuit(s) may draw a charging current via the SuBUS to perform a defined slave operation. Notably, the master circuit may not have knowledge about exact completion time of the defined slave operation and thus may be unable to resume the SuBUS telegram communication in a timely manner. The slave circuit(s) can be configured to generate a predefined interruption pulse sequence to cause the master circuit to resume the SuBUS telegram communication over the SuBUS. As such, it may be possible for the master circuit to quickly resume the SuBUS telegram communication, thus helping to improve throughput of the SuBUS.

20 Claims, 5 Drawing Sheets

(51) Int. Cl.
    *G06F 13/362* (2006.01)
    *H04L 12/403* (2006.01)
    *H04L 12/40* (2006.01)

(56) References Cited

U.S. PATENT DOCUMENTS

| | | | |
|---|---|---|---|
| 5,459,660 | A | 10/1995 | Berra |
| 5,621,897 | A | 4/1997 | Boury et al. |
| 5,684,803 | A | 11/1997 | Nguyen Thuy |
| 5,734,847 | A | 3/1998 | Garbus et al. |
| 5,774,680 | A | 6/1998 | Wanner et al. |
| 5,787,132 | A | 7/1998 | Kishigami et al. |
| 5,832,207 | A | 11/1998 | Little et al. |
| 5,978,860 | A | 11/1999 | Chan et al. |
| 6,094,699 | A | 7/2000 | Surugucchi et al. |
| 6,141,708 | A | 10/2000 | Tavallaei et al. |
| 6,189,063 | B1 | 2/2001 | Rekeita et al. |
| 6,292,705 | B1 | 9/2001 | Wang et al. |
| 6,308,255 | B1 | 10/2001 | Gorishek, IV et al. |
| 6,360,291 | B1 | 3/2002 | Tavallaei |
| 6,397,279 | B1 | 5/2002 | Jaramillo et al. |
| 6,408,163 | B1 | 6/2002 | Fik |
| 6,484,268 | B2 | 11/2002 | Tamura et al. |
| 6,985,990 | B2 | 1/2006 | Bronson et al. |
| 7,197,589 | B1 | 3/2007 | Deneroff et al. |
| 7,519,005 | B2 * | 4/2009 | Hejdeman ............... H04L 7/044 340/9.12 |
| 7,685,320 | B1 | 3/2010 | Wishneusky |
| 7,729,427 | B2 | 6/2010 | Kwok |
| 8,509,318 | B2 | 8/2013 | Tailliet |
| 8,694,710 | B2 | 4/2014 | Bas et al. |
| 8,775,707 | B2 * | 7/2014 | Poulsen ............... G06F 13/423 710/110 |
| 9,252,900 | B2 * | 2/2016 | Poulsen ............... H04J 3/06 |
| 9,430,321 | B2 | 8/2016 | Slik |
| 9,519,612 | B2 | 12/2016 | Hietala et al. |
| 9,569,386 | B2 | 2/2017 | Du |
| 9,639,500 | B2 | 5/2017 | Bas et al. |
| 9,652,451 | B2 | 5/2017 | Elder |
| 9,690,725 | B2 | 6/2017 | Sengoku |
| 9,755,821 | B2 | 9/2017 | Jang et al. |
| 9,946,677 | B2 | 4/2018 | Hapke |
| 10,176,130 | B2 | 1/2019 | Ngo et al. |
| 10,185,683 | B2 | 1/2019 | Ngo et al. |
| 10,599,601 | B1 * | 3/2020 | Ngo ............... G06F 13/4295 |
| 2001/0050713 | A1 | 12/2001 | Kubo et al. |
| 2004/0049619 | A1 | 3/2004 | Lin |
| 2004/0100400 | A1 | 5/2004 | Perelman et al. |
| 2004/0128594 | A1 | 7/2004 | Elmhurst et al. |
| 2004/0221067 | A1 | 11/2004 | Huang et al. |
| 2005/0012492 | A1 | 1/2005 | Mihalka |
| 2005/0185665 | A1 * | 8/2005 | Uboldi ............... H04L 25/0264 370/458 |
| 2005/0259609 | A1 | 11/2005 | Hansquine et al. |
| 2006/0031618 | A1 | 2/2006 | Hansquine et al. |
| 2006/0050694 | A1 | 3/2006 | Bury et al. |
| 2006/0152236 | A1 | 7/2006 | Kim |
| 2006/0236008 | A1 | 10/2006 | Asano et al. |
| 2009/0121825 | A1 * | 5/2009 | Har ............... H04L 25/0266 340/3.1 |
| 2009/0248932 | A1 | 10/2009 | Taylor et al. |
| 2010/0305723 | A1 | 12/2010 | Koyama |
| 2010/0306430 | A1 | 12/2010 | Takahashi |
| 2011/0035632 | A1 | 2/2011 | Hong et al. |
| 2011/0113171 | A1 | 5/2011 | Radhakrishnan et al. |
| 2012/0027104 | A1 | 2/2012 | Bas et al. |
| 2012/0030753 | A1 | 2/2012 | Bas et al. |
| 2012/0226965 | A1 | 9/2012 | Hammerschmidt et al. |
| 2012/0303836 | A1 | 11/2012 | Ngo et al. |
| 2013/0054850 | A1 | 2/2013 | Co |
| 2013/0124763 | A1 | 5/2013 | Kessler |
| 2013/0132624 | A1 | 5/2013 | Chen et al. |
| 2013/0166801 | A1 | 6/2013 | Chun et al. |
| 2013/0197920 | A1 | 8/2013 | Lesso et al. |
| 2013/0265884 | A1 | 10/2013 | Brombal et al. |
| 2013/0301689 | A1 | 11/2013 | Marchand et al. |
| 2014/0025999 | A1 | 1/2014 | Kessler |
| 2014/0112339 | A1 | 4/2014 | Safranek et al. |
| 2014/0304442 | A1 | 10/2014 | Hietala et al. |
| 2014/0310436 | A1 | 10/2014 | Du |
| 2014/0376278 | A1 | 12/2014 | Fornage et al. |
| 2015/0056941 | A1 | 2/2015 | Lin et al. |
| 2015/0074306 | A1 * | 3/2015 | Ayyagari ............ G06F 13/4072 710/110 |
| 2015/0106541 | A1 | 4/2015 | Southcombe et al. |
| 2015/0127862 | A1 | 5/2015 | Fan et al. |
| 2015/0149673 | A1 | 5/2015 | Balkan et al. |
| 2015/0169482 | A1 | 6/2015 | Ngo et al. |
| 2015/0192974 | A1 | 7/2015 | Ngo et al. |
| 2015/0193297 | A1 | 7/2015 | Ngo et al. |
| 2015/0193298 | A1 | 7/2015 | Ngo et al. |
| 2015/0193321 | A1 | 7/2015 | Ngo et al. |
| 2015/0193373 | A1 * | 7/2015 | Ngo ............... G06F 13/4291 710/110 |
| 2016/0050513 | A1 | 2/2016 | Wang et al. |
| 2016/0124892 | A1 | 5/2016 | Amarilio et al. |
| 2017/0255250 | A1 * | 9/2017 | Ngo ............... G06F 13/404 |
| 2017/0255578 | A1 | 9/2017 | Ngo et al. |
| 2017/0255579 | A1 | 9/2017 | Ngo et al. |
| 2017/0277651 | A1 | 9/2017 | Ngo et al. |
| 2018/0217959 | A1 | 8/2018 | Ngo et al. |
| 2019/0250876 | A1 | 8/2019 | Amarilio et al. |
| 2020/0151131 | A1 | 5/2020 | Ngo et al. |
| 2020/0394046 | A1 | 12/2020 | Snelgrove et al. |

OTHER PUBLICATIONS

Non-Final Office Action for U.S. Appl. No. 14/575,491, dated May 26, 2017, 20 pages.
Non-Final Office Action for U.S. Appl. No. 14/659,379, dated Apr. 7, 2017, 37 pages.
Author Unknown, "1-Wire," Wikipedia, last modified Jan. 16, 2015, accessed Feb. 12, 2015, http://en.wikipedia.org/wiki/1-Wire, 4 pages.
Author Unknown, "DS1822: Econo 1-Wire Digital Thermometer," Maxim Integrated, 2007, 21 pages.
Author Unknown, "Maxim 1-Wire® Tutorial," MAXIM, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Non-Final Office Action for U.S. Appl. No. 14/575,491, dated Nov. 30, 2017, 18 pages.
Non-Final Office Action for U.S. Appl. No. 14/659,292, dated Sep. 29, 2017, 27 pages.
Final Office Action for U.S. Appl. No. 14/659,292, dated Apr. 30, 2018, 24 pages.
Non-Final Office Action for U.S. Appl. No. 14/659,328, dated Sep. 8, 2017, 51 pages.
Final Office Action for U.S. Appl. No. 14/659,328, dated Mar. 20, 2018, 61 pages.
Notice of Allowance for U.S. Appl. No. 14/659,328, dated Jul. 2, 2018, 8 pages.
Non-Final Office Action for U.S. Appl. No. 14/659,355, dated Sep. 20, 2017, 32 pages.
Final Office Action for U.S. Appl. No. 14/659,355, dated Apr. 17, 2018, 11 pages.
Advisory Action for U.S. Appl. No. 14/659,355, dated Jul. 5, 2018, 3 pages.
Non-Final Office Action for U.S. Appl. No. 15/467,790, dated Jun. 28, 2018, 14 pages.
Ex Parte Quayle Action for U.S. Appl. No. 15/365,315, dated Jul. 26, 2018, 7 pages.
Final Office Action for U.S. Appl. No. 14/659,379, dated Oct. 18, 2017, 44 pages.
Advisory Action for U.S. Appl. No. 14/659,379, dated Feb. 26, 2018, 3 pages.
Notice of Allowance for U.S. Appl. No. 14/659,379, dated Mar. 20, 2018, 10 pages.

(56) References Cited

OTHER PUBLICATIONS

Non-Final Office Action for U.S. Appl. No. 14/659,371, dated Sep. 25, 2017, 23 pages.
Final Office Action for U.S. Appl. No. 14/659,371, dated May 3, 2018, 21 pages.
Advisory Action for U.S. Appl. No. 14/659,371, dated Aug. 1, 2018, 3 pages.
Non-Final Office Action for U.S. Appl. No. 14/659,292, dated Dec. 21, 2018, 23 pages.
Final Office Action for U.S. Appl. No. 14/659,292, dated Jun. 4, 2019, 24 pages.
Non-Final Office Action for U.S. Appl. No. 14/659,355, dated Oct. 12, 2018, 8 pages.
Final Office Action for U.S. Appl. No. 14/659,355, dated May 2, 2019, 8 pages.
Non-Final Office Action for U.S. Appl. No. 15/886,209, dated May 17, 2019, 7 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Final Office Action for U.S. Appl. No. 15/365,295, dated Aug. 15, 2019, 11 pages.
Final Office Action for U.S. Appl. No. 15/467,790, dated Nov. 5, 2018, 15 pages.
Advisory Action for U.S. Appl. No. 15/467,790, dated Feb. 26, 2019, 3 pages.
Notice of Allowance for U.S. Appl. No. 15/467,790, dated May 20, 2019, 8 pages.
Non-Final Office Action for U.S. Appl. No. 15/443,236, dated Nov. 16, 2018, 19 pages.
Final Office Action for U.S. Appl. No. 15/443,236, dated May 30, 2019, 20 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Notice of Allowance for U.S. Appl. No. 15/886,209, dated Sep. 11, 2019, 7 pages.
Notice of Allowance for U.S. Appl. No. 16/402,613, dated Nov. 4, 2019, 9 pages.
Notice of Allowance for U.S. Appl. No. 16/407,397, dated Nov. 12, 2019, 7 pages.
Advisory Action for U.S. Appl. No. 15/365,295, dated Nov. 6, 2019, 3 pages.
Corrected Notice of Allowance for U.S. Appl. No. 15/467,790, dated Aug. 15, 2019, 6 pages.
Corrected Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.
Non-Final Office Action for U.S. Appl. No. 16/736,164, dated Feb. 27, 2020, 7 pages.
International Search Report and Written Opinion for International Patent Application No. PCT/US2020/012702, dated Apr. 7, 2020, 17 pages.
Notice of Allowance for U.S. Appl. No. 15/365,295, dated Feb. 25, 2020, 8 pages.
Final Office Action for U.S. Appl. No. 16/736,164, dated Jun. 2, 2020, 7 pages.
Non-Final Office Action for U.S. Appl. No. 16/599,384, dated Aug. 24, 2020, 8 pages.
Non-Final Office Action for U.S. Appl. No. 16/710,457, dated Aug. 28, 2020, 7 pages.
Office Action for U.S. Appl. No. 16/736,164, dated Sep. 21, 2020, 8 pages.
Final Office Action for U.S. Appl. No. 16/599,384, dated Dec. 1, 2020, 9 pages.
Final Office Action for U.S. Appl. No. 16/736,164, dated Jan. 11, 2021, 10 pages.
Advisory Action for U.S. Appl. No. 16/736,164, dated Mar. 19, 2021, 3 pages.
Notice of Allowance for U.S. Appl. No. 16/736,164, dated Apr. 29, 2021, 8 pages.
Non-Final Office Action for U.S. Appl. No. 17/095,204, dated Oct. 14, 2021, 8 pages.

* cited by examiner

SINGLE-WIRE BUS APPARATUS SUPPORTING SLAVE-INITIATED OPERATION IN A MASTER CIRCUIT

RELATED APPLICATIONS

This application claims the benefit of U.S. provisional patent application Ser. No. 62/837,881, filed on Apr. 24, 2019, the disclosure of which is incorporated herein by reference in its entirety.

FIELD OF THE DISCLOSURE

The technology of the disclosure relates generally to an apparatus configured to operate based on a single-wire communication bus.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, a radio frequency (RF) signal(s) may be first modulated by a transceiver circuit(s) based on a selected modulation and coding scheme (MCS) and then amplified by a power amplifier(s) prior to being radiated from an antenna(s). In many wireless communication devices, the power amplifier(s) and the antenna(s) are typically located in an RF front-end (RFFE) circuit communicatively coupled to the transceiver circuit(s) via an RFFE bus as defined in the MIPI® alliance specification for radio frequency front-end control interface, version 2.1.

However, not all communications require a two-wire serial bus like the RFFE bus. In some case, a single-wire serial bus may be sufficient or even desired for carrying out certain type of communications between circuits. As such, it may be possible to provide a single-wire bus, either concurrent to or independent of, the RFFE bus in a wireless communication device.

SUMMARY

Aspects disclosed in the detailed description include a single-wire bus (SuBUS) apparatus. The SuBUS apparatus includes a master circuit coupled to a slave circuit(s) by a SuBUS. The master circuit can be configured to enable or suspend a SuBUS telegram communication over the SuBUS. When the master circuit suspends the SuBUS telegram communication over the SuBUS, the slave circuit(s) may draw a charging current via the SuBUS to perform a defined slave operation. Notably, the master circuit may not have knowledge about exact completion time of the defined slave operation and thus may be unable to resume the SuBUS telegram communication in a timely manner. In this regard, the slave circuit(s) is configured to generate a predefined interruption pulse sequence (e.g., upon completion of the defined slave operation) to cause the master circuit to perform a corresponding operation, such as resuming the SuBUS telegram communication over the SuBUS. As such, it may be possible for the master circuit to quickly resume the SuBUS telegram communication over the SuBUS after suspending the SuBUS telegram communication, thus helping to improve throughput of the SuBUS.

In one aspect, a SuBUS apparatus is provided. The SuBUS apparatus includes a SuBUS. The SuBUS apparatus also includes a master circuit coupled to the SuBUS. The master circuit is configured to suspend the SuBUS in a bus suspension mode to stop a SuBUS telegram communication over the SuBUS. The master circuit is also configured to activate the SuBUS in a bus communication mode to enable the SuBUS telegram communication over the SuBUS. The SuBUS apparatus also includes at least one slave circuit coupled to the SuBUS. The slave circuit is configured to generate a predefined interruption pulse sequence in the bus suspension mode to cause the master circuit to perform a corresponding operation.

In another aspect, a SuBUS apparatus is provided. The SuBUS apparatus includes a master bus port coupled to a SuBUS. The SuBUS apparatus also includes a master circuit coupled to the SuBUS. The master circuit is configured to suspend the SuBUS in a bus suspension mode to stop a SuBUS telegram communication over the SuBUS. The master circuit is also configured to activate the SuBUS in a bus communication mode to enable the SuBUS telegram communication over the SuBUS in response to receiving a predefined interruption pulse sequence over the SuBUS.

In another aspect, a SuBUS apparatus is provided. The SuBUS apparatus includes at least one slave bus port coupled to a SuBUS. The SuBUS apparatus also includes at least one slave circuit coupled to the SuBUS. The slave circuit is configured to communicate with a master circuit coupled to the SuBUS when the SuBUS is activated in a bus communication mode. The slave circuit is also configured to perform a defined slave operation when the SuBUS is suspended in a bus suspension mode. The slave circuit is also configured to generate a predefined interruption pulse sequence in the bus suspension mode to cause the master circuit to switch from the bus suspension mode to the bus communication mode.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1A:
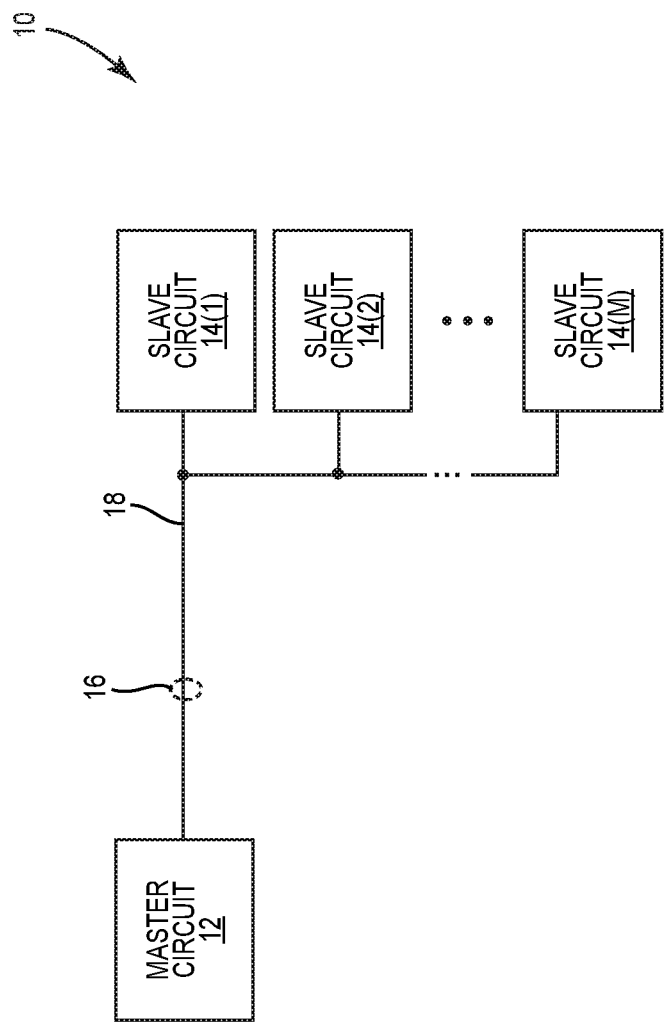
FIG. 1A is a schematic diagram of an exemplary single-wire bus (SuBUS) architecture in which a master circuit is configured to communicate with a slave circuit(s) over a SuBUS having a single wire.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a single-wire bus (SuBUS) apparatus. The SuBUS apparatus includes a master circuit coupled to a slave circuit(s) by a SuBUS. The master circuit can be configured to enable or suspend a SuBUS telegram communication over the SuBUS. When the master circuit suspends the SuBUS telegram communication over the SuBUS, the slave circuit(s) may draw a charging current via the SuBUS to perform a defined slave operation. Notably, the master circuit may not have knowledge about exact completion time of the defined slave operation and thus may be unable to resume the SuBUS telegram communication in a timely manner. In this regard, the slave circuit(s) is configured to generate a predefined interruption pulse sequence (e.g., upon completion of the defined slave operation) to cause the master circuit to perform a corresponding operation, such as resuming the SuBUS telegram communication over the SuBUS. As such, it may be possible for the master circuit to quickly resume the SuBUS telegram communication over the SuBUS after suspending the SuBUS telegram communication, thus helping to improve throughput of the SuBUS.

Figure 1B:
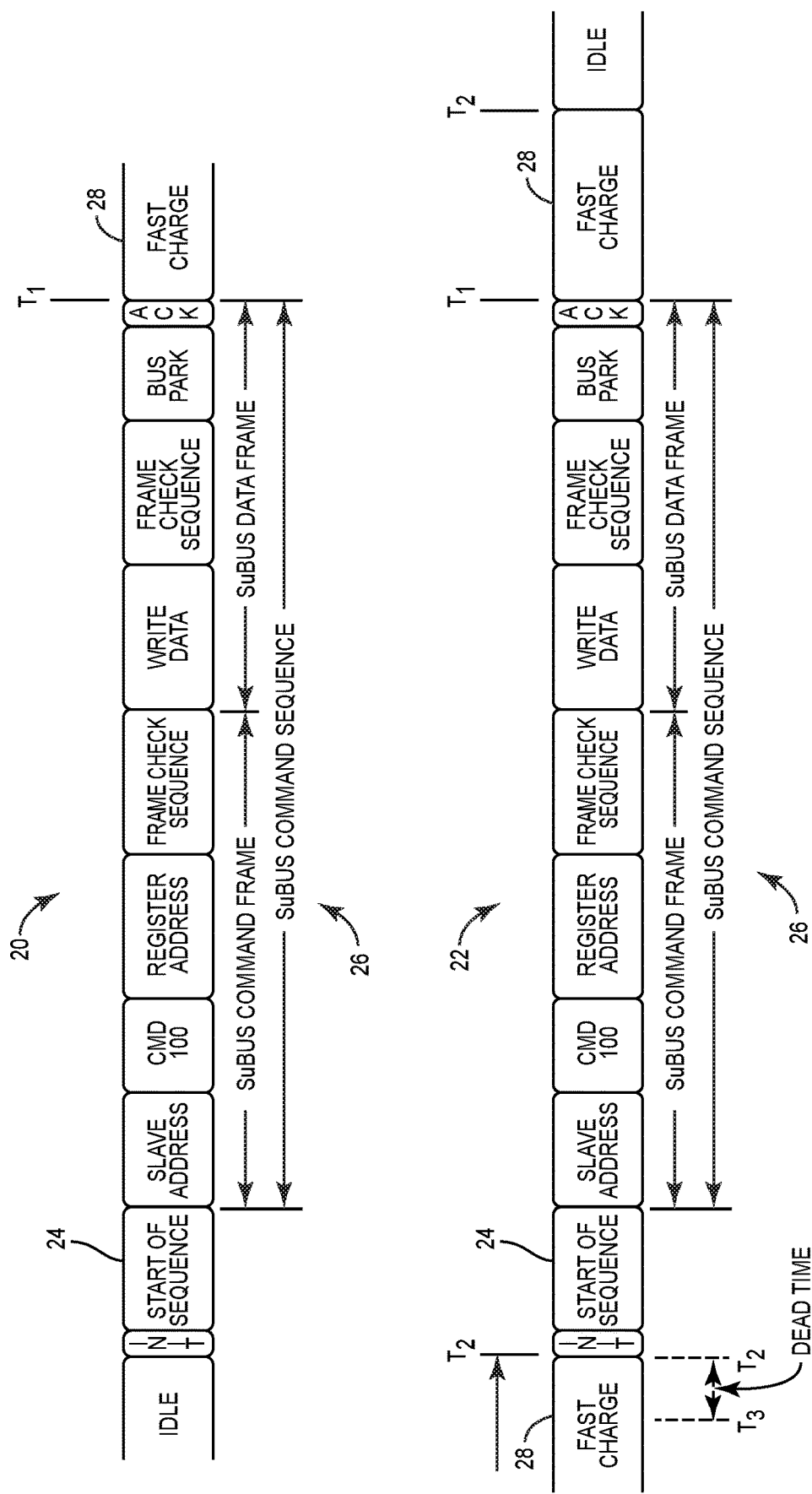
FIG. 1B is a schematic diagram providing an exemplary illustration of one or more SuBUS telegrams communicated over the SuBUS of FIG. 1A.

Before discussing the SuBUS apparatus of the present disclosure, a brief overview of a SuBUS structure is first provided with reference to FIGS. 1A-1B to help understand basic operational principles between a SuBUS master circuit and a SuBUS slave circuit(s). The discussion of specific exemplary aspects of a SuBUS apparatus of the present disclosure starts below with reference to FIG. 2.

In this regard, FIG. 1A is a schematic diagram of an exemplary SuBUS architecture 10 in which a master circuit 12 is configured to communicate with one or more slave circuits 14(1)-14(M) over a SuBUS 16 consisting of a single wire 18. The master circuit 12 is configured to initiate a SuBUS telegram communication over the SuBUS 16 by communicating a SuBUS telegram(s). The slave circuits 14(1)-14(M) may provide a data payload(s) to the master circuit 12 over the SuBUS 16. Hereinafter, when the master circuit 12 and the slave circuits 14(1)-14(M) are communicating the SuBUS telegram(s) and/or the data payload(s) over the SuBUS 16, the master circuit 12 and the slave circuits 14(1)-14(M) are said to be in a bus communication mode.

FIG. 1B is a schematic diagram providing an exemplary illustration of one or more SuBUS telegrams 20, 22 communicated over the SuBUS 16 of FIG. 1A. Each of the SuBUS telegrams 20, 22 includes a start of sequence (SOS) training sequence 24 and a SuBUS command sequence 26. The SuBUS command sequence 26 may correspond to a predefined SuBUS operation (e.g., register-read or register-write). The SOS training sequence 24 always precedes the SuBUS command sequence 26 and is always communicated from the master circuit 12 to the slave circuits 14(1)-14(M) in FIG. 1A.

The SuBUS telegram 22, which succeeds the SuBUS telegram 20, may be separated from the SuBUS telegram 20 by a fast charge period 28 that starts at time $T_1$ and ends at time $T_2$ ($T_2 > T_1$). The fast charge period 28 is configured to allow each of the slave circuits 14(1)-14(M) to draw a higher charging current via the SuBUS 16 and carry out a defined slave operation. As such, the master circuit 12 suspends the SuBUS telegram communication over the SuBUS 16 at time $T_1$ and reactivates the SuBUS 16 at time $T_2$ to resume the SuBUS telegram communication. Hereinafter, the master circuit 12 and the slave circuits 14(1)-14(M) are said to be in a bus suspension mode during the fast charging period 28.

Notably, the master circuit 12 may not have knowledge as to how long the slave circuits 14(1)-14(M) will take to complete the defined slave operation. As such, the master circuit 12 may be forced to set the fast charge period 28 long enough to avoid preempting the defined slave operation performed by the slave circuits 14(1)-14(M). In some cases, the slave circuits 14(1)-14(M) may have completed the defined slave operation well ahead of the time $T_2$ (e.g., at time $T_3$). However, the master circuit 12 is unaware of the time $T_3$ and will not resume the SuBUS telegram communication over the SuBUS 16 until time $T_2$, thus causing a so-called "dead time" between the time $T_3$ and the time $T_2$. As a result, the SuBUS may suffer a reduced throughput. Hence, it may be desirable to eliminate the "dead time" in the fast charging period 28 to help improve throughput of the SuBUS 16.

Figure 2:
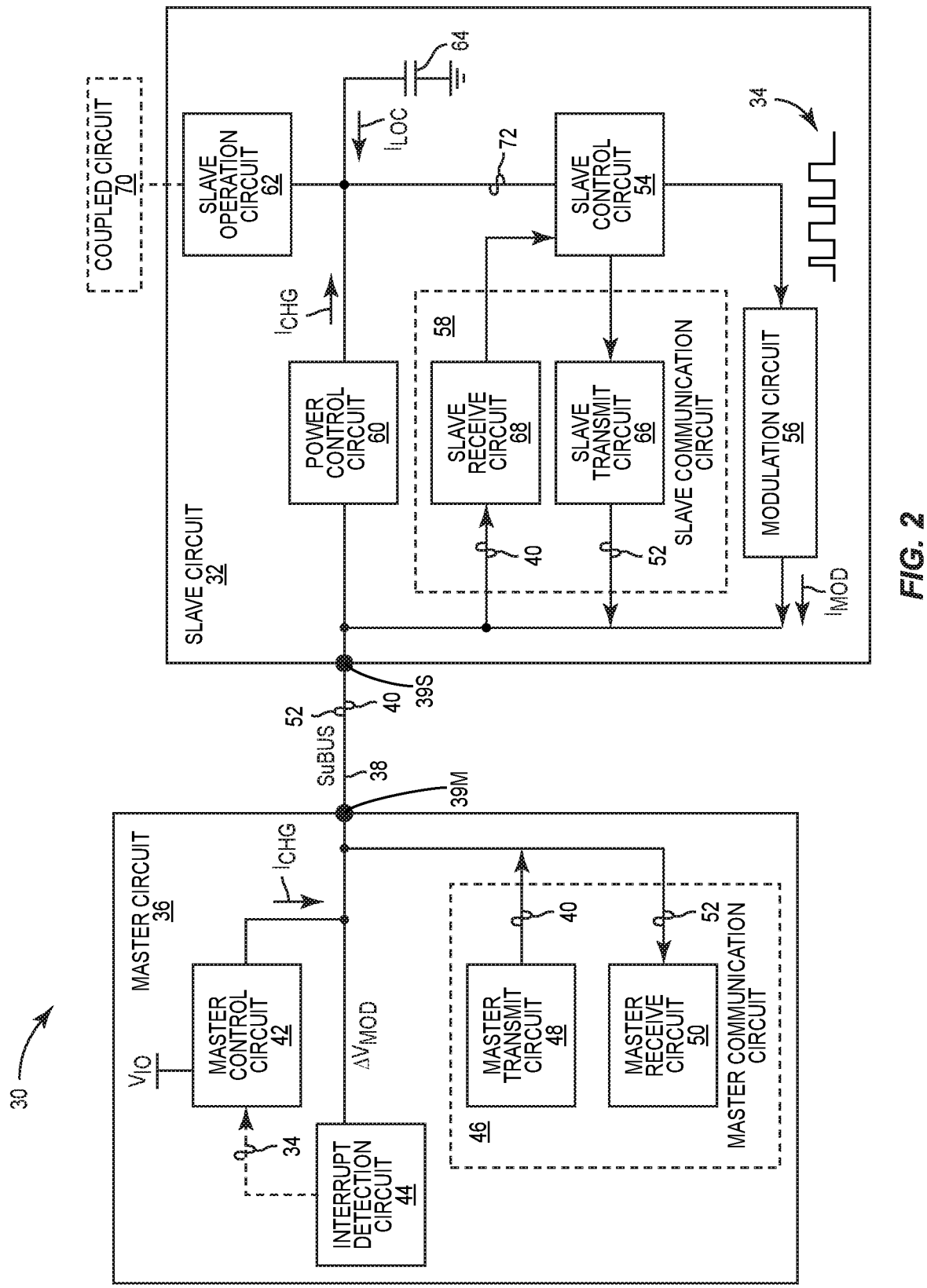
FIG. 2 is a schematic diagram of an exemplary SuBUS apparatus in which at least one slave circuit is configured to generate a predefined interruption pulse sequence to cause a master circuit to perform a corresponding operation, such as switching from a bus suspension mode to a bus communication mode to resume a SuBUS telegram communication over a SuBUS.

In this regard, FIG. 2 is a schematic diagram of an exemplary SuBUS apparatus 30 in which at least one slave circuit 32 is configured to generate a predefined interruption pulse sequence 34 to cause a master circuit 36 to perform a corresponding operation, such as switching from a bus suspension mode to a bus communication mode to resume a SuBUS telegram communication over a SuBUS 38. In a non-limiting example, the master circuit 36 includes a master bus port 39M and the slave circuit 32 includes at least one slave bus port 39S. Accordingly, the master circuit 36 can be coupled to the SuBUS 38 via the master bus port 39M and the slave circuit 32 can be coupled to the SuBUS 38 via the slave bus port 39S. In examples discussed herein, the master circuit 36 is functionally equivalent to the master circuit 12, the slave circuit 32 is functionally equivalent to any of the slave circuits 14(1)-14(M), and the SuBUS 38 is identical to the SuBUS 16 in FIG. 1A. In this regard, the master circuit 36 is configured to communicate a SuBUS telegram(s) 40 over the SuBUS 38 in a similar manner as previously discussed in FIG. 1B.

Similar to the master circuit 12 in FIG. 1A, the master circuit 36 is configured to communicate the SuBUS telegram(s) 40 over the SuBUS 38 in the bus communication mode. In the bus suspension mode, such as during the fast charge period 28 in FIG. 1B, the master circuit 36 stops communicating the SuBUS telegram(s) 40 and provides a charging current $I_{CHG}$ to the slave circuit 32 over the SuBUS 38. Accordingly, the slave circuit 32 can perform a defined slave operation (e.g., impedance measurement, non-volatile memory read, etc.) based on the charging current $I_{CHG}$.

Like the master circuit 12 in FIG. 1A, the master circuit 36 may not have knowledge about exact completion time of the defined slave operation performed by the slave circuit 32. In this regard, to help eliminate the "dead time," as illustrated in FIG. 1B, in the SuBUS 38, the slave circuit 32 is configured to generate the predefined interruption pulse sequence 34 (e.g., upon completion of the defined slave operation) to cause the master circuit 36 to switch from the bus suspension mode to the bus communication mode to resume communication of the SuBUS telegram(s) 40 over the SuBUS 38.

As such, it may be possible for the master circuit 36 to resume the SuBUS telegram communication without having to wait until the end of the fast charge period 28 (e.g., time $T_2$). As a result, it may be possible to eliminate or reduce the dead time in the SuBUS 38, thus helping to improve throughput of the SuBUS 38. By relying on the predefined interruption pulse sequence 34 to resume the SuBUS telegram communication over the SuBUS 38, the master circuit 36 may be further configured to make the fast charge period 28 an open-ended period by eliminating the time $T_2$. In this regard, the master circuit 36 starts the bus suspension mode at the time $T_1$ and resumes the bus communication mode in response to receiving the predefined interruption pulse sequence 34. It should also be appreciated that, in addition to causing the master circuit 36 to switch from the bus suspension mode to the bus communication mode, it may also be possible to generate the predefined interruption pulse sequence 34 in different patterns to cause the master circuit 36 to perform different operations, respectively.

In a non-limiting example, the master circuit 36 includes a master control circuit 42, an interrupt detection circuit 44, and a master communication circuit 46. The master control circuit 42 may be configured to activate the SuBUS 38 in the bus communication mode to communicate the SuBUS telegram(s) 40 with the slave circuit 32 and suspend the SuBUS 38 in the bus suspension mode to stop communicating the SuBUS telegram(s) 40 with the slave circuit 32. In the bus suspension mode, the master control circuit 42 may also be configured to generate the charging current $I_{CHG}$ based on a supply voltage $V_{IO}$ and provide the charging current $I_{CHG}$ to the slave circuit 32 over the SuBUS 38. In contrast, in the bus communication mode, the master control circuit 42 may cut off the charging current $I_{CHG}$ such that the SuBUS telegram(s) 40 can be communicated over the SuBUS 38.

The master communication circuit 46 may include a master transmit circuit 48 and a master receive circuit 50. The master transmit circuit 48 may be configured to provide the SuBUS telegram(s) 40 to the SuBUS 38 in the bus communication mode. The master receive circuit 50 may be configured to receive a data payload(s) 52 from the SuBUS 38 in the bus communication mode. The interrupt detection circuit 44 may be coupled to the SuBUS 38 and configured to detect the predefined interruption pulse sequence 34. The interrupt detection circuit 44 will be further discussed in FIG. 3 below.

In a non-limiting example, the slave circuit 32 includes a slave control circuit 54, a modulation circuit 56, a slave communication circuit 58, a power control circuit 60, a slave operation circuit 62, and a charging capacitor 64. The slave communication circuit 58 may include a slave transmit circuit 66 and a slave receive circuit 68. The slave transmit circuit 66 may be configured to provide the data payload(s) 52 to the SuBUS 38 in the bus communication mode. The slave receive circuit 68 may be configured to receive the SuBUS telegram(s) 40 from the SuBUS 38 in the bus communication mode.

In the bus suspension mode, the power control circuit 60 is configured to couple the charging capacitor 64 to the SuBUS 38 such that the charging capacitor 64 can be charged by the charging current $I_{CHG}$. In the bus communication mode, the master circuit 36 cuts off the charging current $I_{CHG}$. In this regard, the power control circuit 60 is configured to decouple the charging capacitor 64 from the SuBUS 38. As a result, the charging capacitor 64 is discharged to generate a local current $I_{LOC}$ to power the slave circuit 32 in the bus communication mode.

The slave operation circuit 62, which can be an analog circuit for example, may be coupled to a coupled circuit 70 (e.g., an impedance measurement circuit or a non-volatile memory) and configured to perform the defined slave operation (e.g., impedance measurement or non-volatile memory read) in the bus suspension mode. In a non-limiting example, the slave operation circuit 62 can generate a notification signal 72 indicative of the completion of the defined slave operation. The slave control circuit 54 may be configured to generate the predefined interruption pulse sequence 34 in response to receiving the notification signal 72.

The modulation circuit 56 may be configured to generate a modulated current $I_{MOD}$ based on the predefined interruption pulse sequence 34 and provide the modulated current $I_{MOD}$ to the master circuit 36 via the SuBUS 38. As discussed in detail below in FIG. 3, the modulated current $I_{MOD}$ may cause a modulated voltage change $\Delta V_{MOD}$, which may be used by the interrupt detection circuit 44 to detect the predefined interruption pulse sequence 34. The interrupt detection circuit 44 may, in turn, provide the predefined interruption pulse sequence 34 to the master control circuit 42 to cause the master control circuit 42 to switch from the bus suspension mode to the bus communication mode.

Figure 3:
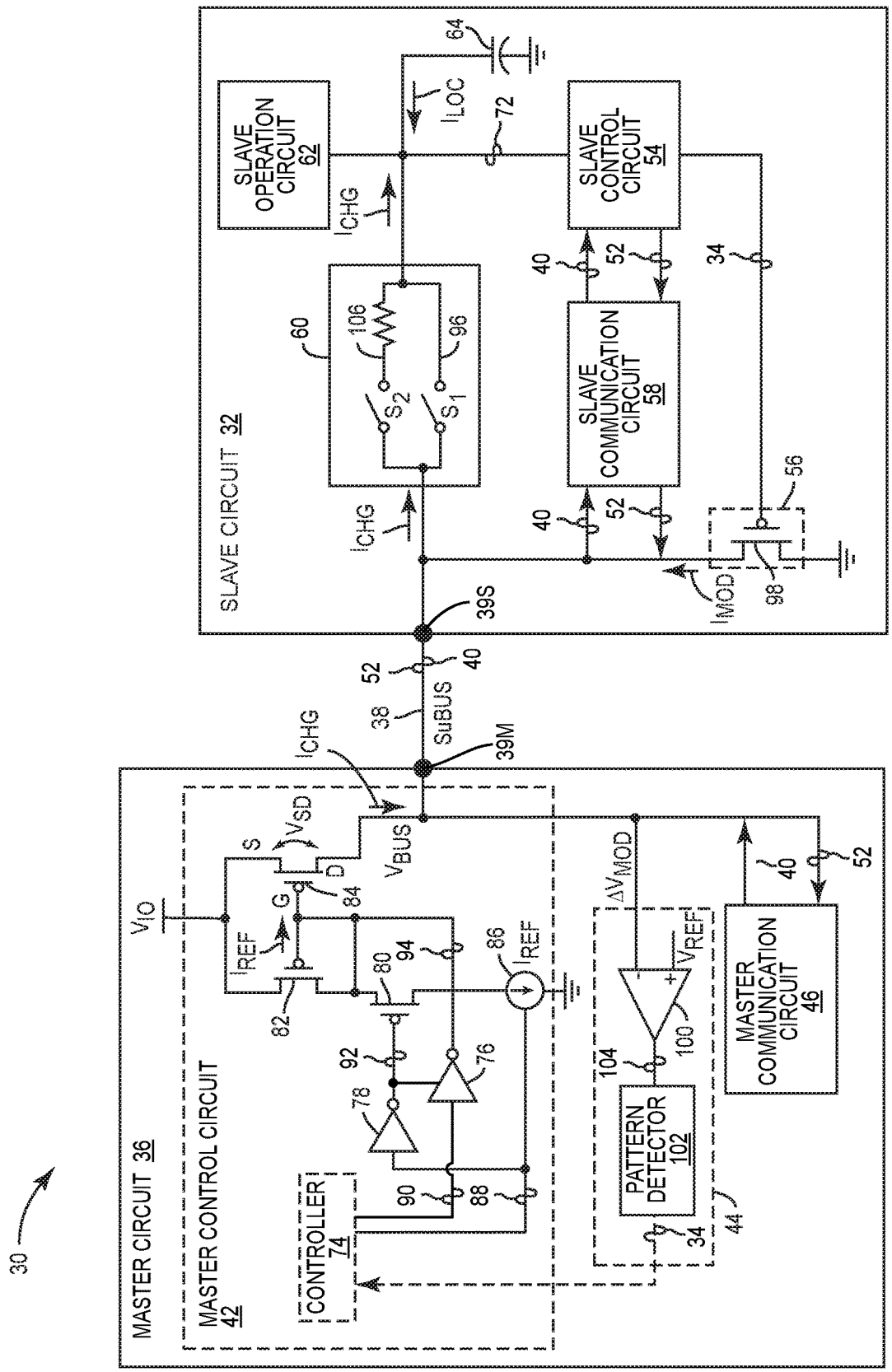
FIG. 3 is a schematic diagram providing an exemplary illustration of the SuBUS apparatus of FIG. 2 configured according to an embodiment of the present disclosure.

FIG. 3 is a schematic diagram providing an exemplary illustration of the SuBUS apparatus 30 of FIG. 2 configured according to an embodiment of the present disclosure. Common elements between FIGS. 2 and 3 are shown therein with common element numbers and will not be re-described herein.

The master control circuit 42 may include a controller 74, which can be a microprocessor or a microcontroller as an example. The controller 74 may be configured to suspend the SuBUS 38 in the bus suspension mode and resume the SuBUS 38 in the bus communication mode. In a non-limiting example, the master control circuit 42 includes a tri-state inverter 76, an inverter 78, a first p-type field-effect transistor (PFET) 80, a second PFET 82, and a fast charge PFET 84 arranged as illustrated in FIG. 3. The master control circuit 42 may also include a reference current source 86 configured to generate a reference current $I_{REF}$. Collectively, the reference current source 86, the first PFET 80, the second PFET 82, and the fast charge PFET 84 form a current mirror circuit. In this regard, the charging current $I_{CHG}$ is a mirrored current that is proportionally related to the reference current $I_{REF}$. In other words, it may be possible to control the charging current $I_{CHG}$ by adjusting the reference current $I_{REF}$.

More specifically, the fast charge PFET 84 includes a gate electrode G, a source electrode S, and a drain electrode D. The source electrode S is configured to receive the supply voltage $V_{IO}$, the gate electrode G is configured to receive the reference current $I_{REF}$, and the drain electrode D is coupled to the SuBUS 38 to output the charging current $I_{CHG}$ that is proportionally related to the reference current $I_{REF}$.

The controller 74 may be configured to suspend the SuBUS 38 in the bus suspension mode and resume the SuBUS 38 in the bus communication mode based on a bus mode signal 88 and a fast charge signal 90.

In a non-limiting example, to enable the SuBUS 38 to communicate the SuBUS telegram(s) 40 in the bus communication mode, the controller 74 can set both the bus mode signal 88 and the fast charge signal 90 to a logical "LOW" (e.g., low voltage). As such, the bus mode signal 88 can cause the reference current source 86 to be turned off and, thus, not to generate the reference current $I_{REF}$. The inverter 78 inverts the bus mode signal 88 to generate a first inverted signal 92 as a logical "HIGH" (e.g., high voltage) to cause the tri-state inverter 76 not to operate in a "tri-state" mode. As a result, the tri-state inverter will invert the fast charge signal 90 to generate a second inverted signal 94 as a logical "HIGH" (e.g., high voltage), thus causing the second PFET 82 and the fast charge PFET 84 to be turned off. The second inverted signal 94, which is the logical "HIGH" (e.g., high voltage), also causes the first PFET 80 to be turned off. As a result, the master control circuit 42 will not provide the charging current $I_{CHG}$ to the SuBUS 38.

Continuing with the non-limiting example above, the power control circuit 60 in the slave circuit 32 may include a first switch $S_1$ and a second switch $S_2$. In the bus suspension mode, the power control circuit 60 may be controlled (e.g., by the slave control circuit 54) to open both the first switch $S_1$ and the second switch $S_2$ to decouple the charging capacitor 64 from the SuBUS 38. Accordingly, the charging capacitor 64 discharges to generate the local current $I_{LOC}$ to power the slave communication circuit 58 for communicating the SuBUS telegram(s) 40 and/or the data payload(s) 52.

In another non-limiting example, to suspend the SuBUS 38 in the bus suspension mode, the controller 74 can set both the bus mode signal 88 and the fast charge signal 90 to a logical "HIGH" (e.g., high voltage). As such, the bus mode signal 88 can cause the reference current source 86 to be turned on to generate the reference current $I_{REF}$. The inverter 78 will invert the bus mode signal 88 to generate the first inverted signal 92 as a logical "LOW" (e.g., low voltage), thus causing the tri-state inverter 76 to operate in the tri-state mode. In addition, the first inverted signal 92 also causes the first PFET 80 to be turned on. As a result, the fast charge PFET 84 will generate the charging current $I_{CHG}$ based on the reference current $I_{REF}$.

The controller 74 may control the reference current source 86 to adjust the reference current $I_{REF}$ and thus to adjust the charging current $I_{CHG}$. In a non-limiting example, the reference current $I_{REF}$ can be so generated to minimize a source-drain voltage $V_{SD}$ between the source electrode S and the drain electrode D of the fast charge PFET 84. As a result, in the bus suspension mode, the SuBUS 38 may be pulled up to a predefined bus voltage $V_{BUS}$ that substantially equals the supply voltage $V_{IO}$ (e.g., $V_{IO} - V_{BUS} \leq 70$ mV). By pulling the SuBUS 38 to the predefined bus voltage $V_{BUS}$ that substantially equals the supply voltage $V_{IO}$, it may be easier for the interrupt detection circuit 44 to detect the modulated voltage change $\Delta V_{MOD}$ on the SuBUS 38.

Continuing with the above non-limiting example in the bus suspension mode, the power control circuit 60 in the slave circuit 32 may be controlled (e.g., by the slave control circuit 54) to close the first switch $S_1$, while keeping the second switch $S_2$ open, to provide a fast-charging path 96 between the SuBUS 38 and the charging capacitor 64. As such, the charging current $I_{CHG}$ may recharge the charging capacitor 64 at a faster rate and power the slave operation circuit 62 to perform the defined slave operation.

In response to receiving the notification signal 72 indicative of the completion of the defined slave operation, the slave control circuit 54 generates the predefined interruption pulse sequence 34. The modulation circuit 56, which include an n-type field-effect transistor (NFET) 98, may be configured to generate the modulated bus current $I_{MOD}$ based on the predefined interruption pulse sequence 34 to cause the predefined bus voltage $V_{BUS}$ to vary around a predefined reference voltage $V_{REF}$, which is lower than the predefined bus voltage $V_{BUS}$, to cause the modulated voltage change $\Delta V_{MOD}$ on the SuBUS 38.

Figure 4:
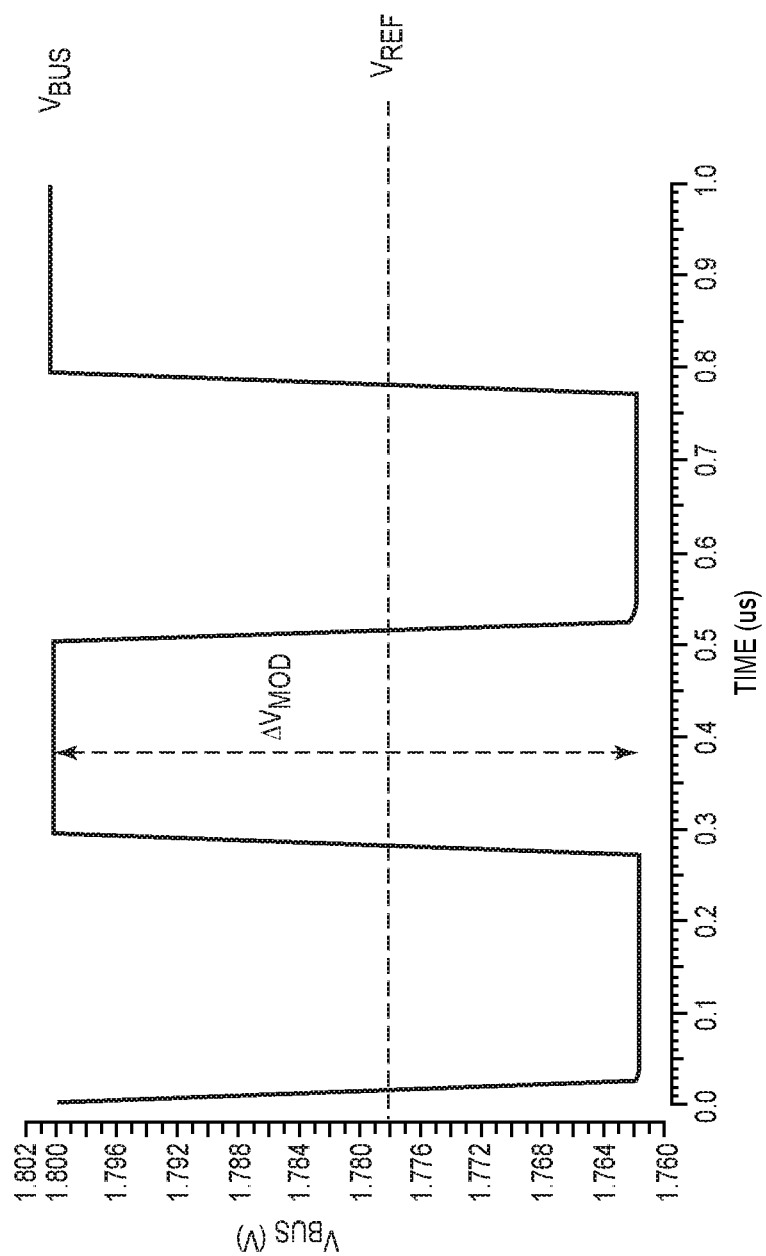
FIG. 4 is a graphic diagram providing an exemplary illustration of a modulated voltage change on the SuBUS that can be used to detect the predefined interruption pulse sequence in the master circuit of FIG. 2.

In this regard, FIG. 4 is a graphic diagram providing an exemplary illustration of the modulated voltage change $\Delta V_{MOD}$ on the SuBUS 38. In a non-limiting example, the master control circuit 42 may cause the predefined bus voltage $V_{BUS}$ to be pulled up to approximately 1.8 V, while setting the predefined reference voltage $V_{REF}$ at approximately 1.77 V. The modulated bus current $I_{MOD}$, which is generated based on the predefined interruption pulse sequence 34, causes the predefined bus voltage $V_{BUS}$ to vary between approximately 1.8 V and approximately 1.765 V, thus creating the modulated voltage change $\Delta V_{MOD}$ for the detection of the predefined interruption pulse sequence 34 in the master circuit 36.

With reference back to FIG. 3, the interrupt detection circuit 44 may include a voltage comparator 100 and pattern detector 102. The voltage comparator 100 may be configured to compare the predefined bus voltage $V_{BUS}$ with the predefined reference voltage $V_{REF}$ and the pattern detector 102 may be configured to detect the predefined interruption pulse sequence 34 based on an output 104 of the voltage comparator 100. Accordingly, the interrupt detection circuit 44 may provide the predefined interruption pulse sequence 34 to the master control circuit 42 for switching the SuBUS 38 between the bus communication mode and the bus suspension mode.

Notably, it may not be necessary for the slave circuit 32 to perform the defined slave operation in the bus suspension mode. Instead, the slave circuit 32 may be idle in the bus suspension mode. In this regard, the power control circuit 60 in the slave circuit 32 may be controlled (e.g., by the slave control circuit 54) to close the second switch $S_2$, while keeping the first switch $S_1$ open, to provide a low current path 106 between the SuBUS 38 and the charging capacitor 64 to recharge the charging capacitor 64 at a slower rate. In this regard, it may be necessary for the slave control circuit 54 to generate the predefined interruption pulse sequence 34 to cause the master circuit 36 to switch from the bus suspension mode to the bus communication mode. However, the slave control circuit 54 may still generate the predefined interruption pulse sequence 34 (e.g., with different pulse patterns) to provide other types of interruption indication to the master circuit 36.

Those skilled in the art will recognize improvements and modifications to the embodiments of the present disclosure. All such improvements and modifications are considered within the scope of the concepts disclosed herein and the claims that follow.

What is claimed is:

1. A single-wire bus (SuBUS) apparatus comprising:
a SuBUS;
a master circuit coupled to the SuBUS and configured to:
suspend the SuBUS in a bus suspension mode to stop a SuBUS telegram communication over the SuBUS; and
activate the SuBUS in a bus communication mode to enable the SuBUS telegram communication over the SuBUS; and
at least one slave circuit coupled to the SuBUS and configured to generate a predefined interruption pulse sequence in the bus suspension mode in different pulse patterns each configured to cause the master circuit to perform a corresponding operation.

2. The SuBUS apparatus of claim 1 wherein the at least one slave circuit is further configured to generate the predefined interruption pulse sequence in the bus suspension mode to cause the master circuit to switch from the bus suspension mode to the bus communication mode to resume the SuBUS telegram communication over the SuBUS.

3. The SuBUS apparatus of claim 1 wherein the at least one slave circuit is further configured to:
perform a defined slave operation in the bus suspension mode; and
generate the predefined interruption pulse sequence upon completion of the defined slave operation.

4. The SuBUS apparatus of claim 3 wherein:
the master circuit is further configured to communicate a fast charge period to the at least one slave circuit for performing the defined slave operation; and
the at least one slave circuit is further configured to generate the predefined interruption pulse sequence upon completion of the defined slave operation and prior to expiration of the fast charge period.

5. The SuBUS apparatus of claim 3 wherein the at least one slave circuit comprises a slave operation circuit configured to perform the defined slave operation selected from the group consisting of: an impedance measurement operation and a non-volatile memory read operation.

6. The SuBUS apparatus of claim 1 wherein the master circuit comprises a master control circuit configured to:
activate the SuBUS in the bus communication mode to enable the SuBUS telegram communication with the at least one slave circuit over the SuBUS; and
suspend the SuBUS in the bus suspension mode to suspend the SuBUS telegram communication with the at least one slave circuit over the SuBUS.

7. The SuBUS apparatus of claim 6 wherein the master control circuit is further configured to:
generate and provide a charging current to the at least one slave circuit via the SuBUS in the bus suspension mode; and
cut off the charging current from the at least one slave circuit in the bus communication mode.

8. The SuBUS apparatus of claim 7 wherein the at least one slave circuit comprises a power control circuit and a charging capacitor, the power control circuit configured to:
couple the charging capacitor to the SuBUS in the bus suspension mode to cause the charging capacitor to be charged by the charging current; and
decouple the charging capacitor from the SuBUS in the bus communication mode to cause the charging capacitor to discharge to generate a local current to power the at least one slave circuit in the bus communication mode.

9. The SuBUS apparatus of claim 7 wherein, in the bus suspension mode, the master control circuit is further configured to:
generate the charging current based on a supply voltage; and
maintain the SuBUS at a predefined bus voltage substantially equal to the supply voltage.

10. The SuBUS apparatus of claim 9 wherein the master control circuit comprises a fast charge p-type field-effect transistor (PFET), the PFET comprising:
a source electrode configured to receive the supply voltage;
a gate electrode configured to receive a reference current; and
a drain electrode coupled to the SuBUS and configured to generate the charging current proportional to the reference current.

11. The SuBUS apparatus of claim 10 wherein the reference current is selected to minimize a source-drain voltage between the source electrode and the drain electrode of the PFET to cause the predefined bus voltage to substantially equal the supply voltage.

12. The SuBUS apparatus of claim 9 wherein the at least one slave circuit comprises:
   a Slave control circuit configured to generate the predefined interruption pulse sequence in the bus suspension mode; and
   a modulation circuit configured to generate a modulated bus current on the SuBUS based on the predefined interruption pulse sequence to cause the predefined bus voltage to vary around a predefined reference voltage lower than the predefined bus voltage in accordance with the predefined interruption pulse sequence.

13. The SuBUS apparatus of claim 12 wherein the master circuit further comprises an interrupt detection circuit configured to:
   detect the predefined interruption pulse sequence based on the predefined bus voltage and the predefined reference voltage; and
   provide the predefined interruption pulse sequence to the master control circuit to cause the master control circuit to perform the corresponding operation.

14. The SuBUS apparatus of claim 13 wherein the interrupt detection circuit comprises:
   a voltage comparator coupled to the SuBUS and configured to compare the predefined bus voltage with the predefined reference voltage; and
   a pattern detector coupled to the voltage comparator and configured to detect the predefined interruption pulse sequence based on an output of the voltage comparator.

15. A single-wire bus (SuBUS) apparatus comprising:
   a master bus port coupled to a SuBUS; and
   a master circuit coupled to the SuBUS and configured to:
      suspend the SuBUS in a bus suspension mode to stop a SuBUS telegram communication over the SuBUS; and
      activate the SuBUS in a bus communication mode to enable the SuBUS telegram communication over the SuBUS in response to receiving a predefined interruption pulse sequence over the SuBUS and in a distinctive pulse pattern configured to cause the master circuit to activate the SuBUS.

16. The SuBUS apparatus of claim 15 further comprising at least one slave circuit coupled to the SuBUS and configured to generate the predefined interruption pulse sequence in the bus suspension mode to cause the master circuit to switch from the bus suspension mode to the bus communication mode.

17. The SuBUS apparatus of claim 15 wherein, in the bus suspension mode, the master circuit is further configured to:
   generate a charging current based on a supply voltage; and
   maintain the SuBUS at a predefined bus voltage substantially equal to the supply voltage.

18. A single-wire bus (SuBUS) apparatus comprising:
   at least one slave bus port coupled to a SuBUS; and
   at least one slave circuit coupled to the SuBUS and configured to:
      communicate with a master circuit coupled to the SuBUS when the SuBUS is activated in a bus communication mode;
      perform a defined slave operation when the SuBUS is suspended in a bus suspension mode; and
      generate a predefined interruption pulse sequence in the bus suspension mode and in a distinctive pulse pattern configured to cause the master circuit to switch from the bus suspension mode to the bus communication mode.

19. The SuBUS apparatus of claim 18 wherein the at least one slave circuit is further configured to generate the predefined interruption pulse sequence upon completion of the defined slave operation.

20. The SuBUS apparatus of claim 19 wherein the at least one slave circuit is further configured to:
   receive a fast charge period from the master circuit for performing the defined slave operation; and
   generate the predefined interruption pulse sequence upon completion of the defined slave operation and prior to expiration of the fast charge period.

* * * * *